United States Patent
Okunseinde et al.

(10) Patent No.: US 8,782,405 B2
(45) Date of Patent: Jul. 15, 2014

(54) PROVIDING TRANSACTION-LEVEL SECURITY

(75) Inventors: Folu Okunseinde, Austin, TX (US); Tyron Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2681 days.

(21) Appl. No.: 10/803,590

(22) Filed: Mar. 18, 2004

(65) Prior Publication Data

US 2005/0209974 A1   Sep. 22, 2005

(51) Int. Cl.
- *H04L 9/32* (2006.01)
- *H04L 29/06* (2006.01)
- *G06F 15/16* (2006.01)
- *G06F 9/00* (2006.01)

(52) U.S. Cl.
USPC .............. 713/168; 713/154; 709/229; 726/12

(58) Field of Classification Search
USPC ...................... 713/168, 154; 709/229; 726/12
See application file for complete search history.

(56) References Cited

U.S. PATENT DOCUMENTS

| | | | |
|---|---|---|---|
| 4,104,721 A | 8/1978 | Markstein et al. | 364/200 |
| 5,602,916 A | 2/1997 | Grube et al. | 381/21 |
| 5,898,781 A * | 4/1999 | Shanton | 713/166 |
| 5,923,879 A | 7/1999 | Sasmazel et al. | |
| 6,256,676 B1 | 7/2001 | Taylor et al. | |
| 6,405,202 B1 * | 6/2002 | Britton et al. | 707/9 |
| 6,442,619 B1 | 8/2002 | Ouellette | |
| 6,499,036 B1 | 12/2002 | Gurevich | |
| 6,754,214 B1 * | 6/2004 | Mahalingaiah | 370/392 |
| 7,072,967 B1 * | 7/2006 | Saulpaugh et al. | 709/229 |
| 7,133,930 B2 * | 11/2006 | Munger et al. | 709/245 |
| 7,188,345 B2 | 3/2007 | Gilfix et al. | |
| 7,191,450 B2 | 3/2007 | Gilfix et al. | |
| 7,225,249 B1 * | 5/2007 | Barry et al. | 709/227 |
| 7,350,204 B2 * | 3/2008 | Lambert et al. | 717/172 |
| 2002/0099952 A1 * | 7/2002 | Lambert et al. | 713/200 |
| 2002/0116454 A1 | 8/2002 | Dyla et al. | |
| 2002/0133700 A1 | 9/2002 | Maurin et al. | 713/156 |
| 2002/0184264 A1 | 12/2002 | Berg et al. | |
| 2003/0014617 A1 | 1/2003 | Tamboli et al. | |

(Continued)

FOREIGN PATENT DOCUMENTS

CN    1376008 A    10/2002
CN    1406025 A    3/2003

(Continued)

OTHER PUBLICATIONS

McLoone, M. et al., *A Single-Chip IPSEC Cryptographic Processor*, Oct. 16-18, 2002, pp. 133-138.

(Continued)

*Primary Examiner* — Techane Gergiso (74) *Attorney, Agent, or Firm* — Stephen J. Walder, Jr.; David A. Mims, Jr.

(57) ABSTRACT

A method and apparatus is presented for providing transaction-level security. The method comprises determining security information associated with at least one object of a transaction and determining if a remote device is capable of providing a level of security indicated by at least a portion of the security information. The method further comprises transmitting the object to the remote device in response to determining that the remote device is capable of providing the level of security.

11 Claims, 5 Drawing Sheets

(56) References Cited

U.S. PATENT DOCUMENTS

| | | | |
|---|---|---|---|
| 2003/0037174 A1 | 2/2003 | Lavin et al. | |
| 2003/0084203 A1 | 5/2003 | Yoshida et al. | |
| 2003/0084292 A1 | 5/2003 | Pierce et al. | 713/168 |
| 2003/0088790 A1 | 5/2003 | Kaler et al. | 713/201 |
| 2003/0110169 A1 | 6/2003 | Zuili et al. | 707/9 |
| 2003/0110315 A1 | 6/2003 | Upton | |
| 2003/0120672 A1* | 6/2003 | Bingham | 707/100 |
| 2003/0140140 A1 | 7/2003 | Lahtinen | 709/224 |
| 2003/0172368 A1 | 9/2003 | Alumbaugh et al. | |
| 2003/0177356 A1 | 9/2003 | Abela | 713/168 |
| 2004/0001594 A1* | 1/2004 | Krishnaswamy et al. | 380/277 |
| 2004/0103277 A1* | 5/2004 | Seada et al. | 713/160 |
| 2004/0107286 A1* | 6/2004 | Larson et al. | 709/229 |
| 2004/0139322 A1* | 7/2004 | Kaler et al. | 713/170 |
| 2004/0139352 A1* | 7/2004 | Shewchuk et al. | 713/201 |
| 2004/0259529 A1* | 12/2004 | Suzuki | 455/411 |
| 2005/0044197 A1* | 2/2005 | Lai | 709/223 |
| 2005/0188072 A1* | 8/2005 | Lee et al. | 709/223 |
| 2005/0223108 A1 | 10/2005 | Maffeis et al. | |
| 2006/0059107 A1 | 3/2006 | Elmore et al. | |
| 2007/0067779 A1 | 3/2007 | Gilfix et al. | |

FOREIGN PATENT DOCUMENTS

| | | |
|---|---|---|
| EP | 1016989 A3 | 1/2002 |
| EP | 1244322 B1 | 3/2002 |
| JP | 920030034 | 3/2003 |
| WO | WO 00/74345 A1 | 12/2000 |
| WO | WO 2004/070494 A2 | 8/2004 |

OTHER PUBLICATIONS

Davis, A., et al., *A Comparative Study of DCOM and SOAP*, 2002, pp. 48-55.

Nakamur, Y., et al., *Towards the Integration of Web Services Security on Enterprise Environments*, Jan. 28, 2002, pp. 166-175.

European Official Communication dated Aug. 28, 2007 for Application Serial No. 05716766.0-1244; 4 pgs.

International Search Report and Written Opinion dated May 10, 2005 for International Application No. PCT/EP2004/050044, 13 pages.

International Search Report and Written Opinion dated Jun. 7, 2005 for International Application No. PCT/EP2005/050758, 10 pages.

USPTO U.S. Appl. No. 10/361,202.

USPTO U.S. Appl. No. 10/392,765.

USPTO U.S. Appl. No. 11/467,604.

Gudgin, M. et al., "W3C: SOAP Version 1.2 Part 1: Messaging Framework", W3C Working Draft 2, Oct. 2, 2001, XP-002198054, 23 pages.

Atkinson, B et al., "Web Services Security (WS-Security)", IBM Developerworks, http://schemas.xmlsoap.org/specs/ws-security/ws-security.htm, Apr. 5, 2002, 28 pages.

Fox, et al., "Status of Hand-Held Interface to Garnet Collaborative Environment", Indiana University, Jan. 24, 2002, 15 pages.

IBM, "Adapter Architecture", IBM Corporation, 1997, 2003, accessed on Apr. 28, 2006, 3 pages.

Rine, et al., "Using Adapters to Reduce Interaction Complexity in Reusable Component-Based Software Development", ACM, 1999, pp. 37-43.

\* cited by examiner

PROVIDING TRANSACTION-LEVEL SECURITY

BACKGROUND OF THE INVENTION

1. Field of the Invention

The invention generally relates to a communications system and, in particular, to providing transaction-level security in the communications system.

2. Description of the Related Art

Computer systems and related technology affect many aspects of society. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

Communicating electronically via a computer network typically includes transferring electronic messages between computer systems to cause the computer systems to operate in a desired manner. To transfer an electronic message, the sending computer system typically transmits the electronic message in corresponding data packets over one or more communication links to a receiving computer system (often referred to as transferring data packets "over-the-wire"). The receiving computer system then uses the data packets to reconstruct the message. In some cases, data packets may be transferred over a communication link that directly couples one computer system to another computer system (i.e., a one-to-one relationship). However, more frequently, a communication link is utilized by a number of computer systems in a many-to-many relationship. For example, a number of clients connected to an Internet Service Provider ("ISP") may each be able to electronically communicate with the various other clients connected to the ISP (as well as users connected to other ISPs).

Due at least in part to the ease and efficiency of electronic communication, the number and diversity of entities that use electronic communication is quite large. As electronic communications has become a popular form of communications, there has been a greater emphasis placed on the level of security that is provided for electronic communications. Whether the electronic communications involve a bank transaction or a supplier order request, each transaction requires some level of security and integrity.

A variety of prior-art techniques have been proposed to provide security for electronic communications. For example, in the context of Internet-based transactions, one technique for making Web-based transactions more secure is Web Services-Security (WS-S), which is directed to providing quality of protection through message integrity, message confidentiality, and single message authentication. WS-S can be used to accommodate a wide variety of security models and encryption technologies. Generally, WS-S describes security characteristics of Web Services interactions, where the security characteristics are statically defined through a Web Services Descriptive Language (WSDL) definition and supported by header information stored in an object.

Prior art techniques, including Web Services-Security, provide a connection-level (or transport-level) security, rather than a transaction-level security. That is, business transactions performed over a given secure connection are accorded the same protection, even though some transactions may require a different level of security than others. For example, transactions involving transmission of credit card numbers may require a higher level of security than transactions involving transmission of invoices. Current security techniques, however, do not provide transaction-level security.

Prior art security techniques also suffer from at least another shortcoming in that these techniques do not maintain a consistent level of security for business transactions that span across multiple network connections or networked machines. For example, consider a business transaction that has at least a certain level of security associated therewith, and that the business transaction has to traverse multiple, independently-managed network connections before it can be completed. In such a case, the prior art security techniques do not provide a mechanism for maintaining the desired level of security as the business transaction traverses from one computer system to another or from one network connection to another. This shortcoming makes the business transaction more susceptible to attacks, thereby giving rise to security concerns.

The present invention is directed to addressing the effects of, one or more of the problems set forth above.

SUMMARY OF THE INVENTION

In one aspect of the instant invention, a method is presented for providing transaction-level security. The method includes determining security information associated with at least one object of a transaction and determining if a remote device is capable of providing a level of security indicated by at least a portion of the security information. The method further includes transmitting the object to the remote device in response to determining that the remote device is capable of providing the level of security.

In another aspect of the instant invention, an apparatus is presented for providing transaction-level security. The apparatus includes a storage unit communicatively coupled to a; control unit. The storage unit stores an object associated with a given transaction. The control unit is adapted to determine security information associated with the at least one object and determine if a remote device is capable of providing a level of security represented by at least a portion of the security information. The control unit is further adapted to transmit the object to the remote device in response to determining that the remote device is capable of providing the level of security.

In yet another aspect of the instant invention, an article comprising one or more machine-readable storage media containing instructions is presented for providing transaction-level security. The instructions, when executed, enable a processor to determine security information associated with at least one object of a given transaction and receive a response from a remote device indicating that remote device is capable of providing a level of security that is represented by at least a portion of the security information. The instructions, when executed, further enable a processor to transmit the object to the remote device in response to receiving the response from the remote device.

In yet another aspect of the instant invention, a system is presented for providing transaction-level security. The system includes a first processor-based device communicatively coupled to a second processor-based device. The first processor-based device is adapted to determine security information associated with at least one object of a given transaction and determine if a second processor-based device is capable of providing a level of security represented by at least a portion of the security information. The first processor-based device is further adapted to transmit the object to the second processor-based device in response to determining that the second processor-based device is capable of providing the level of security. The second processor-based device is adapted to receive the object.

In yet another aspect of the instant invention, a method is presented for providing transaction-level security. The method includes receiving, at a first device, a request from a second device desiring to transmit at least one object. The request includes at least a portion of security information associated with the object and determining if the first device is capable of providing a level of security represented by the security parameter. The method further includes transmitting an indication to the second device based on determining if the first device is capable of providing the level of security.

BRIEF DESCRIPTION OF THE DRAWINGS

The invention may be understood by reference to the following description taken in conjunction with the accompanying drawings, in which like reference numerals identify like elements.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, and as is described in greater detail below, in accordance with one or more embodiments of the present invention, security-related information is included in a business object associated with a transaction, where the information defines a level of security that is desired for that business object. By including security information with business objects, each business object may contain information about the level of security desired for that business object to be processed, thereby making it possible to provide security at an object level or at a transaction level. In one embodiment, as the business object transverses a transmission path, the security-related information associated with that business object is used to determine handling options. For example, if the security-related information associated with a business object indicates that the business object should be transmitted over a HTTPS connection (Hyper Text Transmission Protocol over Secure Socket Layer connection), the transmitting object handler verifies that the receiving device supports a HTTPS connection before the business object is transmitted. The object handler of the receiving device can thereafter verify if the next object handler supports a HTTPS connection. This process may be repeated by the various object handlers along the transmission path until the business object reaches its final destination. In this manner, the security level for a given business object or transaction remains substantially constant across a transmission path even though several object handlers may have processed the business object along the way.

The term "security," as utilized herein, may include, but is not limited to, information relating to a level of confidentiality, authentication, integrity, non-repudiation, and/or authorization that is desired. Generally, "confidentiality" refers to protecting information to be exchanged against eavesdroppers, "authentication" refers to restricting access to e-business applications and data to those with appropriate proof of identity, "integrity" refers to preventing accidental or deliberate modification of the information during transmit, "non-repudiation" refers to preventing the sender of the information from denying having sent it, and "authorization" refers to determining whether or not an entity can access a particular resource.

Figure 1:
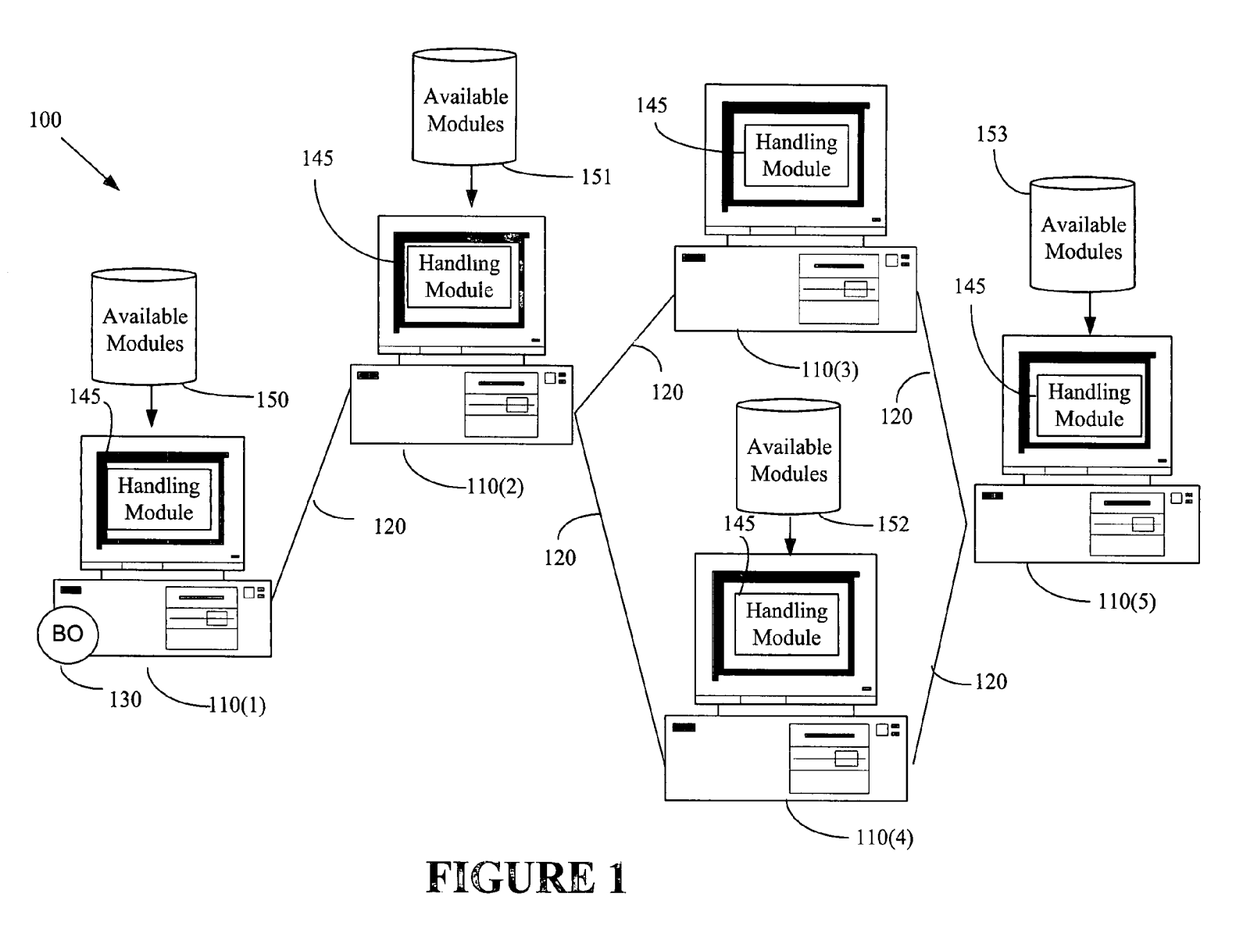
FIG. 1 is a block diagram of an embodiment of a communications system including a handling module for providing object-level security, in accordance with the present invention.

Referring to FIG. 1, a communications system 100 in which a process flow may be implemented is illustrated in accordance with one embodiment of the present invention. The communications system 100 may be employed to implement a business process, which may be a private process (intra-company) or a public process (between companies). The communications system 100 includes a plurality of processor-based devices 110(1-5) that are communicatively coupled by various communication links 120.

The communication links 120 may be any desirable combination of wired and/or wireless links, including traces, wires, cables, radiofrequency links, satellite links, and the like. In one embodiment, the links 120 may form a network or be coupled to a network, which may be a private network (e.g., intranet) or a public network (e.g., the Internet). Although not shown, the various devices 110(1-5) may be coupled to each other through a router (not shown), gateway (not shown), or by other suitable, intervening devices.

The processor-based devices 110(1-5) may be located in remote geographical regions from each other. The devices 110(1-5), in one embodiment, may provide Web services, which are applications that can be accessed via broadly accepted standards such as HTTP and Extensible Markup Language (XML). As is well known to those skilled in the art, XML allows designers to create their own customized tags enabling the definition, transmission, validation, and interpretation of data between applications and between organizations.

Although a variety of protocols may be employed by the processor-based devices 110(1-5) to exchange electronic information, for illustrative purposes the devices 110(1-5) communicate using a convention and well-known protocol called Simple Object Accessing Protocol (SOAP). SOAP is an XML-based protocol for passing objects between components in a decentralized, distributed environment. The SOAP protocol includes an envelope that defines a framework for describing what is in a message and how to process it, a set of encoding rules for expressing datatypes, and a convention for representing remote procedure calls and responses. SOAP may use HTTP or other protocols as the transport mechanism. Additional information on the SOAP protocol can be found in a publication by World Wide Web Consortium, dated Jun. 24, 2003, entitled "SOAP Version 1.2 Part 1: Messaging Framework," which is incorporated by reference herein.

Figure 2:
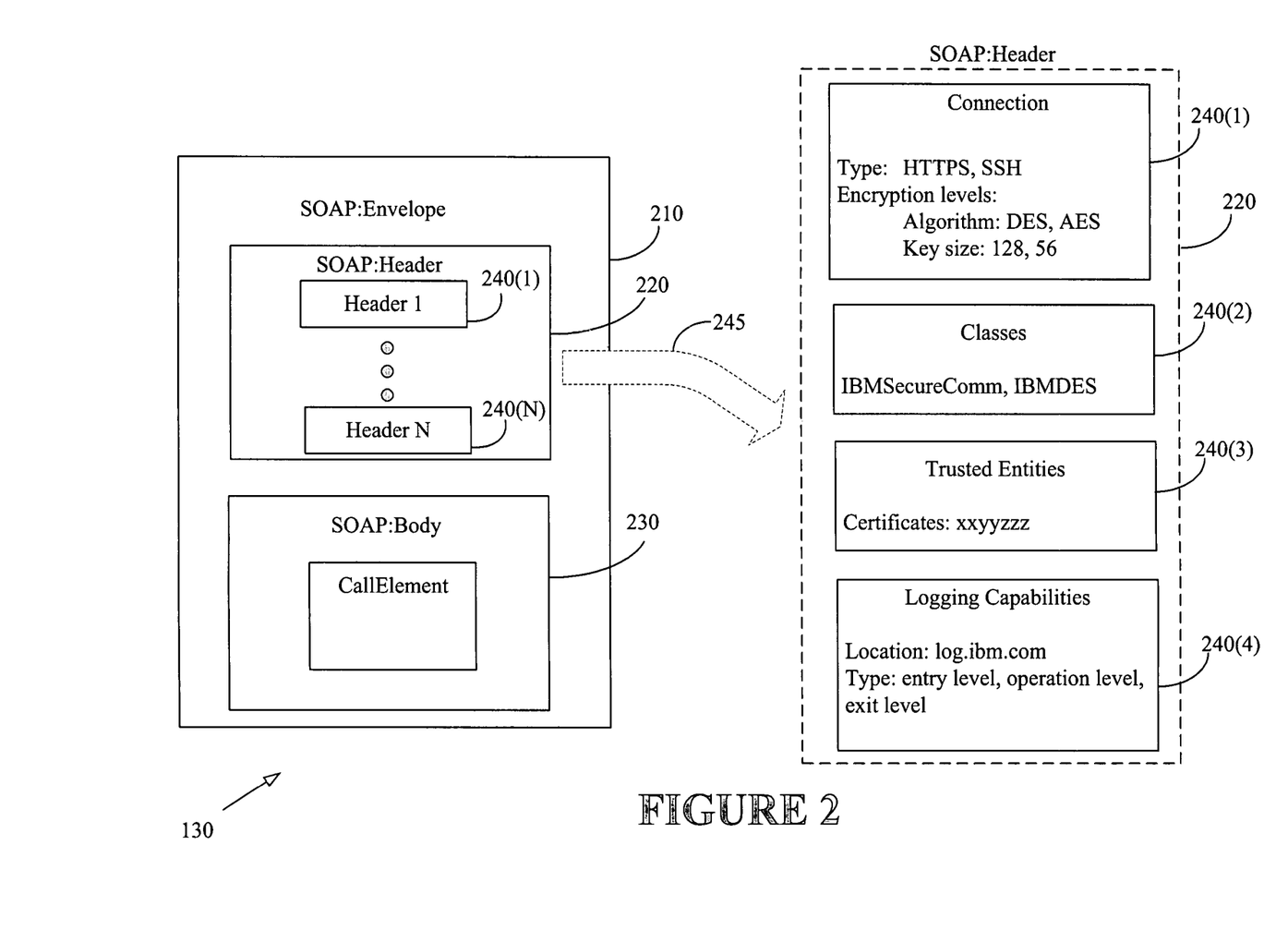
FIG. 2 depicts an exemplary structure of at least a portion of a business object that may be employed in the communications system of FIG. 1, in accordance with one embodiment of the present invention.

The processor-based systems 110(1-5), in the illustrated embodiment, exchange information via business objects (BOs) 130. A business object is an object that represents a business process. Business objects can contain attributes that define the state of the object and methods that define the behavior of the object. Business objects, in one embodiment, may also have relationships with other business objects. Business objects can be used in combination to perform a desired task or desired transaction. Thus, a transaction may include one or more business objects. A business object may include one or more data packets. One example of a business object may be a customer invoice account. In the illustrated embodiment, because the processor-based systems 110(1-5) are assumed to communicate using SOAP, the BO 130 shown in FIG. 1 employs a SOAP object structure, which is shown in FIG. 2 and is discussed later. The various embodiments of the present invention are not limited to business objects, but may also apply to other types of data objects, including streaming media, database tables, emails, instant messages, and the like.

In the illustrated embodiment of FIG. 1, the processor-based devices 110(1-5) include a handling module 145 for transmitting and receiving one or more BOs 130. Generally, and as is described in greater detail below, the handling module 145 transmits a BO 130 to another processor-based device 110 based on security information that is associated with that BO 130. That is, the handling module 145 first determines a level of security that is desired for the BO 130 based on the security information associated with that BO 130, and then transmits the BO 130 to a remote device (e.g., one of the processor-based devices 110(1-5)) that is capable of providing the desired level of security. For example, if the security-related information associated with the BO 130 requires transmission over a HTTPS connection, the handling module 145 queries the remote device 110 to determine if it has the capability of receiving the BO 130 over an HTTPS connection. The remote device 110 may access an associated storage unit 151-153 to determine if it has access to appropriate modules or libraries needed to comply with the security level desired. One or more of the storage units 151-153 may be located locally in the respective processor-based device 110, or, alternatively, they may be remotely located, such as on a network.

In FIG. 1, for illustrative purposes, four of the processor-based devices 110(1), 110(2), 110(4) and 110(5) are depicted to have access to the desired security modules (or libraries) stored in the respective storage units 150, 151, 152, and 153, while one of the processor-based device 110(3) is depicted to not have access to the desired security modules (or libraries). Additionally, for illustrative purposes, FIG. 1 illustrates two communications paths for transmitting electronic information between the first processor-based device 110(1) and the fifth processor-based device 110(5). The first path includes devices 110(1)→110(2)→110(3)→110(5), and the second path includes devices 110(1)→110(2)→110(4)→110(5). Those skilled in the art having the benefit of this disclosure will appreciate that the illustrated configuration of the communications system 100 is exemplary in nature, and that the communication paths between the various devices 110 can vary from one implementation to another.

While a single handling module 145 is depicted with a given processor-based device 110 in FIG. 1, in alternative embodiments, the handling module 145 may include a plurality of modules, with each module capable of providing one or more desired features. For example, the handling module 145 may include a module for accessing the security information associated with a given BO 130. As another example, the handling module 145 may include a module for requesting the remote device 110 to provide information about its security capabilities. Similarly, the handling module 145 may include other modules for performing one or more of the features described herein. The handling module 145 illustrated in FIG. 1 is implemented in software, although in other implementations it may also be implemented in hardware or a combination of hardware and software.

In one embodiment, the handling module 145 may be implemented in a business integration adapter (not shown), which can offer a wide variety of connectivity options to aid in extracting information from packaged, custom, and legacy applications, databases, trading partners' systems, and even from public information stores on the Web. In one embodiment, handling modules 145 may support event-driven, real-time synchronous connections, asynchronous, loosely coupled connections with trading partners, synchronous on-demand connections to customers and even synchronous tightly coupled connections to trusted trading partners.

Although only five devices 110(1-5) are illustrated in FIG. 1, in alternative embodiments, the communications system 100 may include fewer or additional devices without deviating from the spirit and scope of the invention. The devices 110(1-5), in one embodiment, may include, but are not limited to, computers, portable electronic devices, Internet appliances, or any other processor-based device.

Referring now to FIG. 2, an exemplary structure of at least a portion of the business object 130 of FIG. 1 is illustrated, in accordance with one embodiment of the present invention. Because the communications system 100 of FIG. 1 is assumed to employ SOAP for transmitting and receiving electronic information, the BO 130 of FIG. 2 takes the form of a SOAP object structure. Of course, it should be appreciated that, in alternative embodiments, the structure of the BO 130 may vary according to the employed protocol.

The BO 130 illustrated in FIG. 2 includes three parts: an envelop section 210, a header section 220, and a body section 230. The envelope section 210 generally defines a framework for describing what is in the BO 130 and how to process it. The body section 230 may include payload information (e.g., data), and the header section 220 may include one or more headers 240(1-N). The header section 220 may include security information that is indicative of security characteristics required for the BO 130. In accordance with one embodiment of the present invention, and as is described in greater detail later, the handling module 145, based on at least a portion of the security information associated with the BO 130, selects a remote device to which the BO 130 can be transmitted. Examples of the various types of security information that may be populated in the header section 220 is described next with respect to FIG. 2.

As shown by dashed arrow 245, the header section 220 may include a variety of security information that represents the level of security that is desired for the BO 130. The security information shown in FIG. 2 is exemplary in nature, and it should be appreciated that, in alternative embodiments, the type and the extent of security information provided in the header section 220 may vary from one implementation to another. In the illustrated embodiment, and as discussed in greater detail below, the header section 220 includes a plurality of subsections 240(1-4) that include security information relating to the underlying connection, classes, trusted entities, and/or logging capabilities.

The connection subsection 240(1) may include information relating to the underlying connection over which the BO 130 is to be transmitted. As shown in FIG. 2, the connection may indicate the type of connection over which the BO 130 should be transmitted, as well as the encryption level that is desired to encrypt the data carried in the BO 130. For example, the connection type may be a HTTPS connection or it may be based on a secure shell program (SSH). The encryption level may specify a particular encryption algorithm that should be used to encrypt the data stored in the BO 130, as well as a size of the encryption key that should be employed to encrypt the data. For example, as shown in subsection 240(1), the encryption algorithm that may be desired is Data Encryption Standard (DES) or Advanced Encryption Standard (EAS), and the key size may be 56 or 128 bits. In the context of FIG. 1, the BO 130, in one embodiment, may be transmitted to only those devices 110 that support the desired connection that is designated in the subsection 240(1) of the BO 130.

The classes subsection 240(2) may include information relating to a class (or library) of an agreed-upon set of software instructions that executes at the peer device (e.g., one of the remote devices 110) to perform the desired transaction. For example, after a security expert inspects a particular set of software instructions, that set of instructions is thereafter designated as "secure" for a business entity. The designated set of instructions can either be private or public, and should be available (in some format) to both devices 110. If the software instructions that are specified in the classes subsection 240(2) are used to execute a transaction, the likelihood of interference from malicious programs is reduced because the designated software instructions have been previously verified. In the context of FIG. 1, the BO 130, in one embodiment, may be transmitted to only those devices 110 that support the class of software instructions that are designated in the subsection 240(2) of the BO 130. FIG. 2 illustrates two exemplary classes IBMSecureComm and IBMDES that the remote device 110 may be required to have with which the BO 130 is to be processed. Thus, for example, if the remote device 110 does not have access to IBMSecureComm and IBMDES, the sending device 110 may not transmit the BO 130 to the remote device 110.

The trusted entities subsection 240(3) may include certificate information that can be used to determine which device 110 is authorized to process the DO 130. For instance, in the example shown in FIG. 2, the DO 130 may be transmitted to only those remote devices 110 that have the certificate identity of "xxyyzzz." A certificate is commonly used in cryptography to assert something. For example, VeriSign is a certificate authority. If an entity trusts VeriSign, and VeriSign certifies something, then the entity should take that certified data as valid. In the context of the illustrated embodiment of FIG. 1, a certificate may be issued to one or more devices 110 in the system 100, and, in one embodiment, only those devices 110 that have the certificate, and therefore are a certified identity, are allowed to handle the BO 130.

The logging capabilities subsection 240(3) may include information about the type of logging capability the remote device 110 should have before it can receive the BO 130. The subsection 240(3) may also specify a location identifier indicating to which storage location the remote device 110 should transmit the logged information. Logging is a desirable security feature that allows one to trace the path that the BO 130 traverses, and may be used for troubleshooting. In the context of the illustrated embodiment of FIG. 1, if a select device 110 (or a node) is misbehaving in the chain of the transaction, a review of the log may reveal the culprit. The various types of logging capabilities express the level of logging that is required. In FIG. 2, for example, the "entry level" type, "operation level" type, and "exit level" type may indicate that a log message should be sent to the specified location (e.g., log.ibm.com) when the BO 130 is initially handled (e.g., entry level), processed (e.g., operation level), transmitted (e.g., exit level). Because different devices 110(1-4) may have different logging capabilities, in one embodiment, the handling module 145 that is currently processing the BO 130 will only transmit the BO 130 to a remote device 110 that supports the desired level of logging capability.

Figure 4:
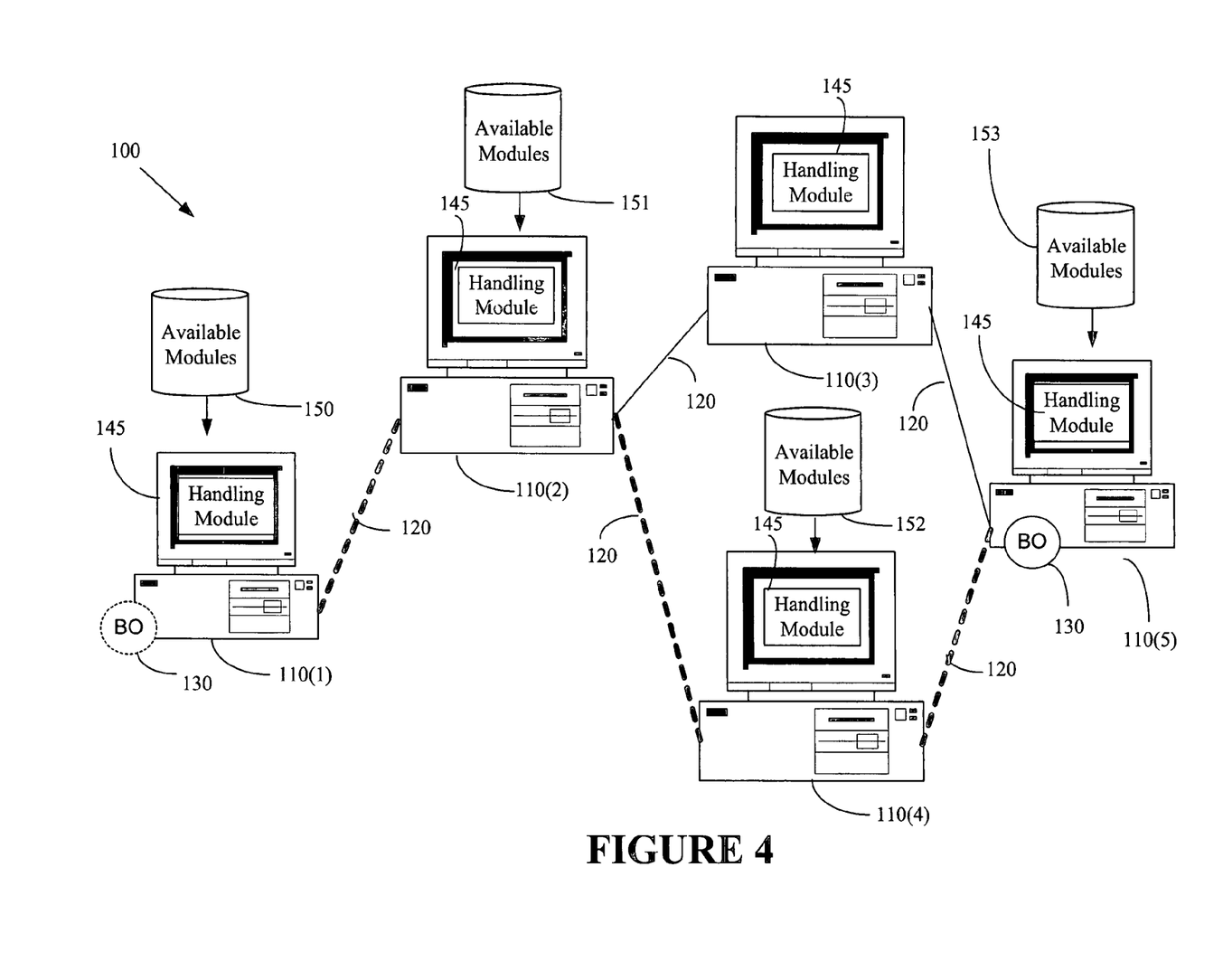
FIG. 4 illustrates an exemplary communications path that is traversed in the communications system of FIG. 1 by the business object of FIG. 2, in accordance with one embodiment of the present invention.

An example of how the security information stored in the header section 220 may be employed to transmit the BO 130 to select remote devices is described with respect to FIG. 4, which is discussed later.

Figure 3:
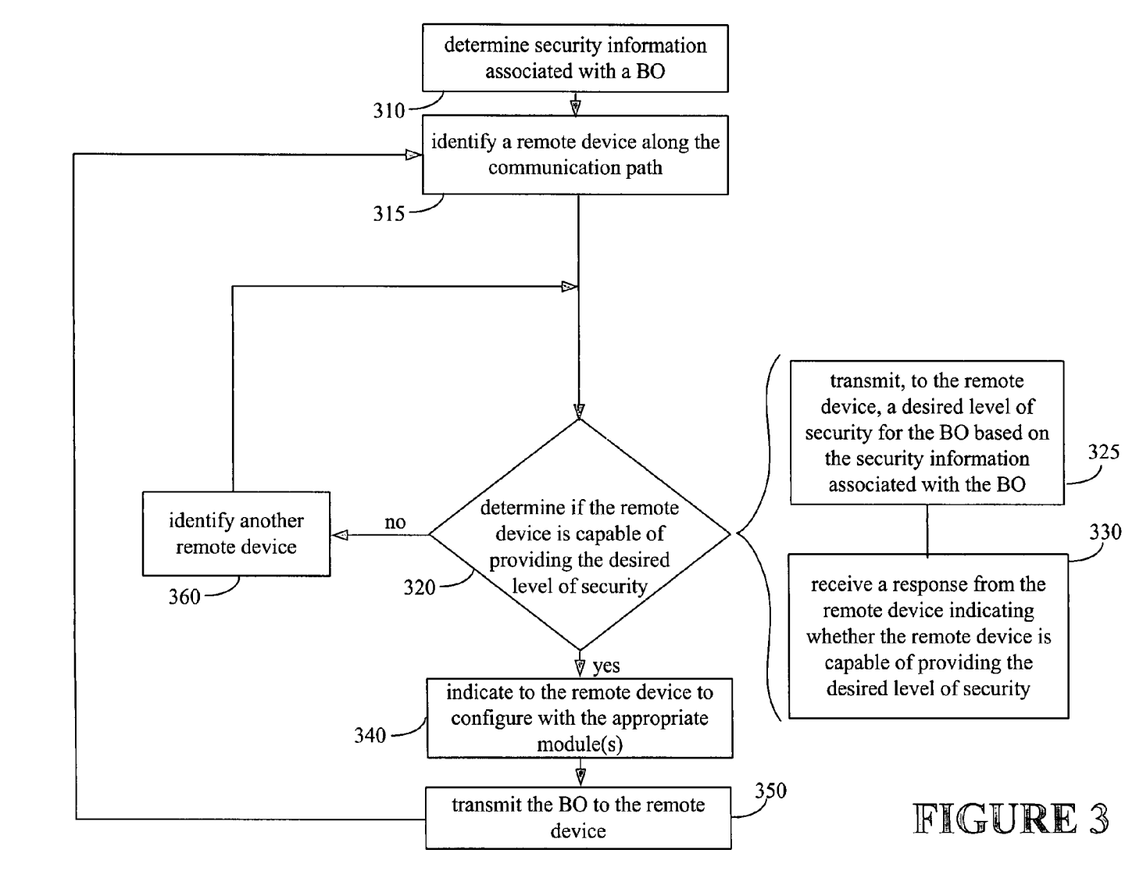
FIG. 3 depicts a flow diagram of at least one aspect of the handling module of FIG. 1, in accordance with one embodiment of the present invention.

Referring now to FIG. 3, a flow diagram of one aspect of the handling module 145 is illustrated, in accordance with one embodiment of the present invention. For clarity, the flow diagram of FIG. 3 is described in the context of the communications system 100 of FIG. 1, and, in particular, in the context of transmitting one or more BOs 130 from the first processor-based device 110(1) to the fifth processor-based device 110(5). For illustrative purposes, it is assumed that the BO 130 is initially in a secure environment, and that it is desirable to maintain a level of security for the BO 130 in accordance with the security parameters associated with it as the BO 130 transmitted within the communications system 100. Further, it is assumed that the third processor-based device 110(3) is incapable of providing the desired security level required by the BO 130. That is, it is assumed that the device 110(3) does not have access to the appropriate module(s) to provide the desired level of security. For example, the device 110(3) may not have access to a HTTPS protocol module, and therefore is unable to provide HTTPS capability, even though the BO 130 requires transmission over a secure HTTPS connection (as opposed to a HTTP connection). As an additional example, the device 110(3) may not have access to the appropriate "logging" module (see element 240(4) of FIG. 2) to provide the desired level of tracking that is specified in the header section 220 of the BO 130. Similarly, the device 110(3) may not have access to other module(s) to provide the desired level security associated with the BO 130. For clarify, the module(s) needed to provide the desired level of security associated with a given BO 130 is hereinafter referred to as "security module(s)."

In FIG. 3, the handling module 145 of the first processor-based system 110(1) determines (at 310) the security information associated with the BO 130 by accessing the security information stored in the headers 240(1-N) (see FIG. 2) of the BO 130. As noted above, the headers 240(1-N) may include a variety of security information, such as encryption levels, communication security, classes desired, logging capabilities, and the like, where at least a portion of the security information is indicative of the security level that is desired for the BO 130. Additionally, in an alternative embodiment, the security information may be stored in another portion of the BO 130 instead of the header section 220.

The handling module 145 identifies (at 315) a remote device 110 in the communication path that may be a candidate for receiving the BO 130. In the illustrated exemplary communications system 100 of FIG. 1, as noted, there are two possible communication paths for transmitting the BO 130 from the first processor-based device 110(1) to the fifth processor-based device 110(5). The first path includes devices 110(1)→110(2)→110(3)→110(5), and the second path includes devices 110(1)→110(2)→110(4)→110(5). Thus, in the context of the communications system 100 of FIG. 1, the handling module 145 may identify (at 315) the second processor-based device 110(2) as a candidate to which the BO 130 may be transmitted.

The handling module 145 next determines (at 320) if the identified remote device 110(2) is capable of providing a desired level of security for the BO 130. In one embodiment, the handling module 145 may determine (at 320) if the remote device 110(2) is capable of providing the desired level of security by requesting such information from the remote device 110(2). For example, the handling module 145 may transmit (at 325) a request to the remote device 110(2), where the request may include information regarding the level of security that is desired to transmit the BO 130. The information that is transmitted (at 325) to the remote device 110(2), in one embodiment, may include information such as that shown in the subsections 240(1-4) of FIG. 2. For example, if the BO 130 can only be transmitted over a secure HTTPS connection, then the handling module 145 may indicate as such to the remote device 110(2). As another example, if the BO 130 can be transmitted to only those remote devices 110 that have a particular class or library of set of executable instructions (see element 240(2) of FIG. 2), the handling module 145 may transmit (at 325) a request to the remote device 110(2) to indicate if it has access to the requisite class or library of instructions. Similarly, if a particular logging capability (e.g., see element 240(4) of FIG. 2) is required before the BO 130 can be transmitted to the remote device 110(2), then the handling module 145 may indicate as such to the remote device 110(2). In alternative embodiments, any other information relating to the desired security level may be transmitted to the remote device 110(2).

The remote device 110(2), upon receiving the transmitted request, may determine if it has access to the appropriate security module(s) to support the desired security level. For example, if an HTTPS connection is desired, then the remote device 110(2) determines if it can access, and subsequently execute the HTTPS module, to establish an HTTPS connection before it receives the BO 130. The module(s) needed for the desired security level may, for example, be stored in the storage unit 151 associated with the remote device 110(2). The target device 110(2) may then respond to the handling module 145 of the first-processor based device 110(1) indicating whether it is capable of supporting the desired security level.

The handling module 145 receives (at 330) from the remote device 110(2) an indication of whether the remote device 110 is capable of providing the desired level of security. In an alternative embodiment, the handling module 145 may receive (at 330) a list representative of the level of security that the remote device 110(2) is able to provide, where the handling module 145 then determines, based on the received list, whether the remote device 110(2) has the capability to provide the desired level of security. For example, the list provided by the remote device 110(2) may include information indicating that the remote device 110(2) is capable of providing either a HTTPS connection or SSH connection, a DES algorithm capability, no logging capability, and so forth. Thus, in this embodiment, the handling module 145 of the first processor-based device 110(1) (as opposed to the remote device 110(2)) makes the determination of whether the remote device 110(2) has the requisite capability.

If the remote device 110(2) is capable of providing the desired level of security, the handling module 145 of the first processor-based device 110(1) indicates (at 340) to the remote device 110(2) to configure itself with the appropriate module(s). For example, if an HTTPS connection is desired, the remote device 110(2) may be requested to configure itself with the HTTPS subroutines, which may be stored on a local storage unit of the device 110(2) or may be stored on a network drive that is accessible to the device 110(2). In some instances, the remote device 110(2) may already be configured with the appropriate security module(s), in which case remote device 110(2) may not need to reload these module(s). The handling module 145 transmits (at 350) the BO 130 to the remote device 110(2). In one embodiment, if desired, the handling module 145, before transmitting (at 350) the BO 130, may verify whether the remote device 110(2) is security compliant (i.e., has configured itself with the appropriate module(s)). This may be accomplished using any suitable technique, including requesting electronic information from the remote device 110(2) that is indicative of security compliance. Alternatively, the handling module 145 may transmit a test message to, and subsequently receive a response from, the remote device 110(2) for verification of security compliance.

If the handling module 145 determines that the remote device 110(2) does not have the capability to provide the level of security specified by the BO 130, the handling module 145, in one embodiment, identifies (at 360) another remote device 110 to which the BO 130 may be transmitted. In the instant case, however, because it is assumed that the target device 110(2) has access to the appropriate access module(s), the BO is transmitted (at 350) to the second processor-based device 110(2).

The above described acts may be repeated by each device 110 along the communications path until the BO 130 reaches its final destination. For instance, in the instant example, once the BO 130 is transmitted to the second processor-based system 110(2), the handling module 145 of the second processor-based system 110(2) performs one or more of the acts illustrated in FIG. 3 to maintain a level of security associated with the BO 130. Specifically, the handling module 145 of the device 110(2) accesses (at 310) the security information stored in the header section 220 (see FIG. 2) of the BO 130 to determine the level of security desired. In one embodiment, the BO 130 may include security information that specifies the level of security desired on a connection or segment level along the communication path. That is, the BO 130 may include security information that specifies a security level that is desired between the first and second processor-based devices 110(1-2) and further specifies a different security level that is desired between the second and fourth processor-based devices 110(2) and 110(4), and so forth. In an alternative embodiment, a security level may be defined in the BO 130 for each device 110(1-5) that processes the BO 130. In this manner, a greater level of granularity may be achieved because the BO 130 may specify the desired security level at a connection or segment level along the communications path.

Once the handling module 145 of the second processor-based device 110(2) determines (at 310) the security information associated with the BO 130, it identifies (at 315) a remote device 110 that may be a candidate for receiving the BO 130. In the illustrated communications system 100 of FIG. 1, the handling module 145 has two devices, namely the device 110(3) and the device 110(4), that may be candidates for receiving the BO 130 before the BO 130 is ultimately delivered to its final destination, which, as noted, is the fifth processor-based device 110(5) in this example. Assuming that the handling module 145 of the device 110(2) identifies (at 315) the third processor-based device 110(3) as a possible candidate, the handling module 145 determines (at 320) if the third processor-based device 110(3) is capable of providing the desired level of security. In the instant case, because it is assumed that the device 110(3) does not have access to the appropriate module(s) to provide the desired security level, the handling module 145 looks for an alternative device 110 that is suitable for receiving the BO 130. That is, the handling module 145 identifies (at 360) another remote device 110, which, in the illustrated example, may be the fourth processor-based device 110(4).

Because the fourth processor-based device 110(4) is capable of providing the desired security level in this example, the handling module 145 of the second processor-based device 110(2) indicates (at 340) to the device 110(4) to configure itself with the appropriate module(s) and then transmits (at 350) the BO to the device 110(4).

The above-described procedure may similarly be performed by the handling module 145 of the fourth processor-based device 110(4) until the BO 130 is delivered to the final destination, which in this case is the fifth processor-based device 110(5). FIG. 4 graphically illustrates a communication path (indicated by dashed lines) that the business object 130 of FIG. 1 traverses from the first processor-based device 110(1) to the fifth processor-based device 110(5) in accordance with one embodiment of the present invention. As shown, because the third processor-based device 110(3) in the illustrated example does not have access to the appropriate security module(s) to provide the security level, the second processor-based device 110(2) instead transmits the BO 130 to the fifth processor-based device 110(5) via the fourth processor-based device 110(4), which, in this example, is capable of providing the desired security level. As such, by requiring the various receiving devices 110 to configure themselves with the appropriate module(s) (or by confirming that the receiving devices 110 are configured with the appropriate module(s)) to support the security level associated with the BO 130, it is possible to maintain a substantially constant level of security from end-to-end, in accordance with one embodiment of the present invention.

Referring again to FIG. 3, it is noted that the acts illustrated in the flow diagram of FIG. 3 represent but one embodiment for providing object-level security, and that in alternative embodiments, various modifications may be made to the described acts without deviating from the spirit and scope of the present invention. For example, one or more of the described acts can either be combined or omitted altogether, depending on the implementation. For example, in one embodiment, the handling module 145 may not indicate (at 340) to the remote device to configure the appropriate security module(s); rather, the remote device 110 may automatically load the appropriate module(s) based on receiving the request that is transmitted (at 325) indicative of the desired security level. As discussed earlier, the security module(s) may be stored locally in the remote device's local storage unit, or, alternatively, may be stored on a remote storage unit that is accessible over a network. Thus, if the remote device 110 automatically configures itself with the appropriate module(s), the handling module 145, in this embodiment, need not provide the indication (at 340) to the remote device 110 to configure itself with the appropriate module(s). Similarly, in one embodiment, the act of determining (at 320) if the remote device is capable of providing the desired security level may be omitted if the BO 130 identifies a predetermined list of processor-based devices 110(1-5) that have access to the appropriate security modules to provide the desired security level. For example, in one embodiment, the BO 130 may specify one or more "trusted entities" in the header 240(3) (see FIG. 2), where these entities are assumed to have access to the appropriate security module(s). As such, in this example, the handling module 145 attempting to transmit the BO 130 may transmit the desired security level to the remote device 110 (i.e., one of the trusted entities), and the remote device 110 may thereafter configure itself with the appropriate module(s) to receive the BO 130. The described acts may be performed in any desired order and thus need not be performed in the order illustrated in FIG. 3.

One embodiment of the present invention is described in the context of a specific transaction occurring in the communications system 100 of FIG. 1. The particular transaction discussed herein is a multi-company credit check. Assume that the various devices 110 in FIG. 1 represent different companies that participate in the process of performing credit check verification. One way multiple companies can participate in this transaction without a central coordination point is through the use of Business Process Execution Language (BPEL), which is well-known to those skilled in the art and thus is not discussed in detail herein.

In FIG. 1, it is assumed that a customer situated at some remote location accesses a website (e.g., creditcard.com) maintained at the first device 110(1) to apply for a credit card. For the purposes of this example, it is assumed that, before a credit card can be issued, several verification procedures need to be completed, including verifying the identity of the customer, credit history check, and certification of the search results, and that these procedures may be performed on the various devices 110. In particular, for illustrative purposes, it is assumed that the second device 110(2) is capable of verifying the customer identity, the third and fourth devices 110 (3-4) are each capable of performing the credit history check, and the fifth device 110(5) certifies the results by having a trusted party verify them.

When the customer provides his or her personal information to the website maintained by device 110(1), the handling module 145 of the device 110(1) initiates a transaction to perform the above-mentioned procedures (e.g., customer identity verification, credit check verification, search result authentication) to determine if the customer qualifies for a credit card. Because of >the confidential nature of this transaction, the handling module 145 may indicate (in the header of a BO) that this transaction must be encrypted using the 3DES encryption algorithm and transmitted over a secure HTTPS connection. Thus, in this example, the desired security level is a secure HTTPS connection with information being encrypted using the 3DES algorithm.

Before forwarding the transaction (or the BO associated with the transaction) to the second device 110(2) to verify the customer's identity, the handling module 145 of the first device 110(1) determines if the second device 110(2) has the capability to support a HTTPS connection and to handle 3DES encryption. If the second device 110(2) does not have such a capability, then the handling module 145 of the first device 110(1) may not employ the customer identity-verification services offered by the second device 110(1); instead, the handling module 145 may either look for another device 110 that performs identity-verification and can provide the desired level of security, or, if no such device 110 is available, indicate to the user that either the transaction cannot be completed or that it can be completed but not with the desired level of security. If, however, the handling module 145 of the first device 110(1) determines that the second device 110(2) has the capability to provide the desired level of security, then the first device 110(1) forwards the transaction over an HTTPS connection (with the encrypted data) to the second device 110(2).

After the second device 110(2) verifies the identity of the customer, the BO associated with the transaction needs to be forwarded to another device 110 for performing a credit check. In this example, as noted earlier, the third and fourth devices 110(3-4) are each capable of providing the credit check. However, for illustrative purposes, it is assumed that the third device 110(3) is not capable of providing the desired security level (i.e., an HTTPS connection, with 3DES encryption), while the fourth device 110(4) does have such a capability. Thus, when the handling module 145 of the second device 110(2) forwards the transaction (or the BO associated therewith), it will send it to the fourth device 110(4) rather than the third device 110(3).

After the fourth device 110(4) performs the credit check history, the results of the information need to be verified by a third party, which, in this example, can be performed by the fifth device 110(5). Similar to the procedure described above, before forwarding the BO (which may include the results of the credit history) to the fifth device 110(5), the handling module 145 of the fourth device 110(4) verifies if the fifth device 110(5) is capable of providing the desired level of security. If it is, the BO is forwarded to the fifth device 110(5), which then verifies the search results. In one embodiment, the fifth device 110(5) may provide the results of the verification back to the first device 110(1) to complete the transaction. Thus, in the above-described example, the transaction can be completed while maintaining a level of security that is specified in the BO that is associated with the transaction. Accordingly, the present invention is able to provide security on a transaction by transaction basis. While the above example is described in the context of a transaction involving a single BO, in other embodiments, a given transaction may have a plurality of BOs associated therewith, where each BO may have its own security level specified therein.

Figure 5:
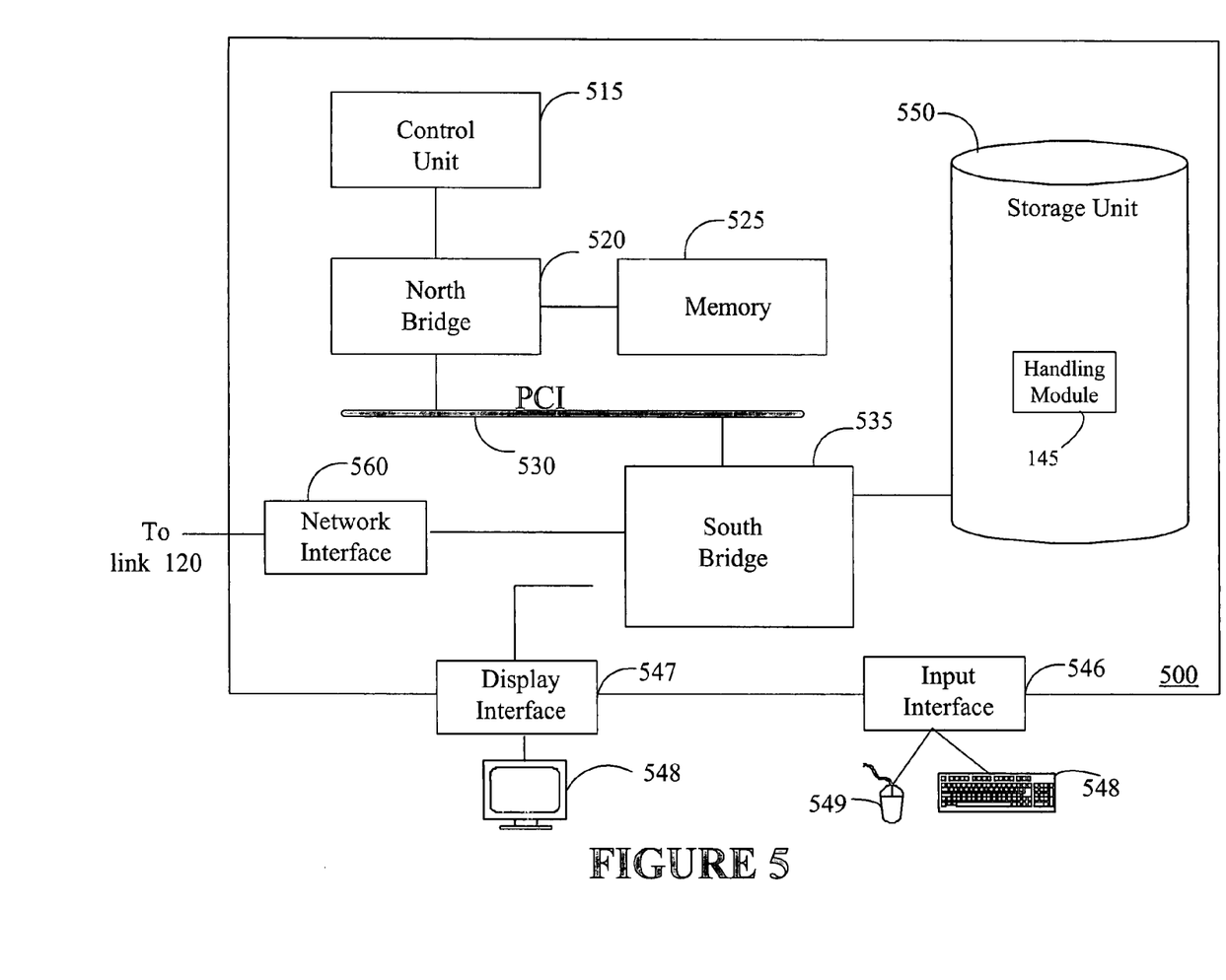
FIG. 5 depicts a block diagram of a processor-based system that may be implemented in the communications system of FIG. 1, in accordance with one embodiment of the present invention.

Referring now to FIG. 5, a stylized block diagram of a device 500 that may be implemented in the communications system 100 of FIG. 1 is illustrated, in accordance with one embodiment of the present invention. That is, the device 500 may represent one embodiment of the processor-based devices 110(1-5). The device 500 includes a control unit 515, which in one embodiment may be a processor that is capable of interfacing with a north bridge 520. The north bridge 520 provides memory management functions for a memory 525, as well as serves as a bridge to a peripheral component interconnect (PCI) bus 530. In the illustrated embodiment, the system 500 includes a south bridge 535 coupled to the PCI bus 530.

A storage unit 550 is coupled to the south bridge 535. The software installed in the storage unit 550 may depend on the features to be performed by the device 500. For example, if the device 500 is implemented as the processor-based device 110 of FIG. 1, then the storage unit 550 may include at least the handling module 145, which may be executable by the control unit 515. Although not shown, it should be appreciated that in one embodiment an operating system, such as Windows®, Disk Operating System®, Unix®, OS/2®, Linux®, MAC OS®, or the like, may be stored on the storage unit 550 and executable by the control unit 515. The storage unit 550 may also include device drivers for the various hardware components of the system 500.

In the illustrated embodiment, the system 500 includes a display interface 547 that is coupled to the south bridge 535. The system 500 may display information on a display device 548 via the display interface 547. The south bridge 535 of the system 500 may include a controller (not shown) to allow a user to input information using an input device, such as a keyboard 548 and/or a mouse 549, through an input interface 546.

The south bridge 535 of the system 500, in the illustrated embodiment, is coupled to a network interface 560, which may be adapted to receive, for example, a local area network card. In an alternative embodiment, the network interface 560 may be a Universal Serial Bus interface or an interface for wireless communications. The system 500 communicates with other devices through the network interface 560. Although not shown, associated with the network interface 560 may be a network protocol stack, with one example being a UDP/IP (User Datagram Protocol/Internet Protocol) stack. UDP is described in RFC 768, entitled "User Datagram Protocol," dated August 1980. In one embodiment, both inbound and outbound packets may be passed through the network interface 560 and the network protocol stack.

It should be appreciated that the configuration of the device 500 of FIG. 5 is exemplary in nature and that, in other embodiments the device 500 may include fewer, additional, or different components without deviating from the spirit and scope of the present invention. For example, in an alternative embodiment, the device 500 may not include a north bridge 520 or a south bridge 535, or may include only one of the two bridges 520, 535, or may combine the functionality of the two bridges 520, 535. As another example, in one embodiment, the system 500 may include more than one control unit 515. Similarly, other configurations may be employed consistent with the spirit and scope of the present invention.

The various system layers, routines, or modules may be executable control units (such as control unit 515 (see FIG. 5)). The control unit 515 may include a microprocessor, a microcontroller, a digital signal processor, a processor card (including one or more microprocessors or controllers), or other control or computing devices. The storage devices 550 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices 550. The instructions when executed by a respective control unit 515 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   determining security information associated with a object of a transaction, wherein the security information is inserted in a header of the object and the object is to be transmitted from a source device to a target device along a transmission path that includes at least one intermediate device;
   determining, at each of the source device, and the at least one intermediate device along the transmission path as the object is transmitted along the transmission path, whether a next device in the transmission path to which the object is to be transmitted provides a level of security indicated by at least a portion of the security information in the header of the object;
   transmitting, at each of the source device, and the at least one intermediate device along the transmission path as the object is transmitted along the transmission path, the object to the next device in the transmission path in response to determining that the next device provides the level of security required by the at least a portion of the security information; and
   determining an alternative device along a different transmission path that provides the level of security required by the at least a portion of the security information in response to determining that the next device in the transmission path does not provide the level of security required by the at least a portion of the security information.

2. The method of claim 1, wherein the object is a business object, and wherein determining if the next device in the transmission path provides the level of security comprises:
   transmitting to the next device in the transmission path information representative of the level of security that is desired; and
   receiving a response from the next device in the transmission path indicating that the next device in the transmission path provides the desired level of security.

3. The method of claim 1, wherein determining the security information comprises accessing the header portion of the object;
   wherein determining if the next device in the transmission path provides a level of security indicated comprises performing at least one of:
      transmitting information representative of the level of security that is desired to the next device in the transmission path prompts the next device in the transmission path to execute at least one module that allows the next device in the transmission path to provide the level of security; and
      comparing the next device in the transmission path to a list of trusted devices in the header portion of the object;
   wherein the transmitting the object to the next device in the transmission path comprises transmitting the object to an object handler module in the next device in the transmission path;
   wherein the object handler module is a business integration adapter supporting connectivity options, the connectivity options comprising at least one of packaged applications, custom applications, legacy applications, databases, trading partners' systems, and public information stores on the internet;
   wherein the object handler module supports at least one of event-driven real-time synchronous connections, asynchronous loosely coupled connections with trading partners, synchronous on-demand connections to customers and synchronous tightly coupled connections to trusted trading partners;
   wherein the object handler module includes at least one of a module for accessing the security information associated with a given object and a module for requesting the adjacent intermediate device in the transmission path to provide information about its security capabilities.

4. The method of claim 1, wherein determining the security information comprises determining security information relating to at least one of connection information, class information, trusted entities information, and logging capability information.

5. The method of claim 3, wherein accessing the header portion of the object comprises accessing at least one header of a Simple Object Access Protocol message.

6. The method of claim 1, further comprising sending a message to the next device in the transmission path instructing the next device to execute at least one module that allows the next device to provide the level of security required by the at least a portion of the security information.

7. The method of claim 1, wherein determining the security information comprises determining the security information in response to receiving the object from at least one of a previous device or a source device in the transmission path.

8. The method of claim 1, wherein the at least one intermediate device includes a plurality of intermediate devices;
   wherein determining if a next device in the transmission path provides a level of security comprises determining, at a previous device in the transmission path, a security level for each intermediate device of the plurality of intermediate devices;
   wherein transmitting the object to the next device in the transmission path, in response to determining that the next device is adapted to provide the level of security, comprises transmitting the object to each of the plurality of intermediate devices in the transmission path in response to determining that each of the plurality of intermediate devices provides the level of security;
   further comprising:
   transmitting the object to the target device.

9. The method of claim 1, wherein the object is one of a plurality of objects of the transaction, and wherein at least two of the objects in the plurality of objects have different security information in their respective headers identifying different levels of security required to be provided by devices along corresponding transmission paths to receive the at least two objects.

10. A method, comprising:
receiving, at a first intermediate device along a transmission path from a source device to a target device, a request from a second device along the transmission path desiring to transmit an object to a third device, wherein the request includes at least a portion of security information associated with the object, the portion of security information being provided in a header of the object;
determining if the first intermediate device is adapted to provide a level of security identified by the at least a portion of security information in the header of the object; and
transmitting an indication to the second device, based on determining if the first intermediate device provides the level of security identified by the at least a portion of security information;
receiving, in the first intermediate device, the object from the second device only in response to the first intermediate device transmitting an indication that the first intermediate device provides the level of security identified by the at least a portion of security information, wherein:
determining if the first intermediate device is adapted to provide the level of security required by the at least a portion of security information includes performing the determining at the source device,
the object is received in the first intermediate device in response to determining that the first intermediate device provides the level of security, and, in response to determining that the first intermediate device provides the level of security:
determining, at the first intermediate device, if a second intermediate device, of the plurality of intermediate devices, that is adjacent to the first intermediate device, provides the level of security indicated by the at least a portion of the security information;
transmitting the object to the second intermediate device of the plurality of intermediate devices in response to determining that the second intermediate device provides the level of security; and
transmitting the object to the target device from the second intermediate device; and
determining an alternative intermediate device along a different transmission path that provides the level of security represented, in response to determining that at least one of the first intermediate device and the second intermediate device in the transmission path does not provide the level of security.

11. The method of claim 10, further comprising configuring the first intermediate device with at least one module that provides the level of security.

* * * * *